(12) United States Patent
Kim et al.

(10) Patent No.: US 10,476,109 B2
(45) Date of Patent: Nov. 12, 2019

(54) NEGATIVE ELECTRODE ACTIVE MATERIAL AND NEGATIVE ELECTRODE INCLUDING THE SAME

(71) Applicant: LG Chem, Ltd., Seoul (KR)

(72) Inventors: Hyun Wook Kim, Daejeon (KR); Eun Kyung Kim, Daejeon (KR); Sun Young Shin, Daejeon (KR)

(73) Assignee: LG Chem, Ltd. (KR)

( * ) Notice: Subject to any disclaimer, the term of this patent is extended or adjusted under 35 U.S.C. 154(b) by 107 days.

(21) Appl. No.: 15/560,006

(22) PCT Filed: Apr. 26, 2016

(86) PCT No.: PCT/KR2016/004360
§ 371 (c)(1),
(2) Date: Sep. 20, 2017

(87) PCT Pub. No.: WO2016/175539
PCT Pub. Date: Nov. 3, 2016

(65) Prior Publication Data
US 2018/0069266 A1    Mar. 8, 2018

(30) Foreign Application Priority Data

Apr. 29, 2015  (KR) .................. 10-2015-0060452
Apr. 25, 2016  (KR) .................. 10-2016-0049966

(51) Int. Cl.
*H01M 2/10*     (2006.01)
*H01M 4/04*     (2006.01)
(Continued)

(52) U.S. Cl.
CPC ..... *H01M 10/0569* (2013.01); *H01M 2/1072* (2013.01); *H01M 4/04* (2013.01);
(Continued)

(58) Field of Classification Search
CPC ......... H01M 2/1072; H01M 2004/027; H01M 4/04; H01M 4/133; H01M 4/1393;
(Continued)

(56) References Cited

U.S. PATENT DOCUMENTS

2004/0151837 A1   8/2004  Morita et al.
2010/0273058 A1  10/2010  Lee et al.
(Continued)

FOREIGN PATENT DOCUMENTS

CN    101916857 A    12/2010
JP    H11246209 A     9/1999
(Continued)

OTHER PUBLICATIONS

Search report from International Application No. PCT/KR2016/004360, dated Jul. 29, 2016.

*Primary Examiner* — Brittany L Raymond
(74) *Attorney, Agent, or Firm* — Lerner, David, Littenberg, Krumholz & Mentlik, LLP (57) ABSTRACT

The present invention relates to a negative electrode active material and a method of preparing the same, the negative electrode active material which includes a core including artificial graphite and hard carbon, and a shell surrounding the core and including natural graphite, wherein the shell is shell is formed to cover a surface of the core by stacking and heading the natural graphite. Since the natural graphite completely surrounds the artificial graphite and the hard carbon, the hard carbon having a low initial efficiency and high electrolyte solution consumption is not exposed to the outside, and thus, high initial efficiency and life characteristics may be obtained. Also, since the natural graphite, the artificial graphite, and the hard carbon are all used, diffusion resistance of lithium ions is lower than that of a case where (Continued)

the natural graphite is only used, and thus, high output characteristics may be achieved.

17 Claims, 5 Drawing Sheets

(51) Int. Cl.
  *H01M 4/133* (2010.01)
  *H01M 4/587* (2010.01)
  *H01M 10/052* (2010.01)
  *H01M 10/0569* (2010.01)
  *H01M 4/1393* (2010.01)
  *H01M 4/36* (2006.01)
  *H01M 10/0525* (2010.01)
  *H01M 4/02* (2006.01)

(52) U.S. Cl.
  CPC ......... *H01M 4/133* (2013.01); *H01M 4/1393* (2013.01); *H01M 4/366* (2013.01); *H01M 4/587* (2013.01); *H01M 10/052* (2013.01); *H01M 10/0525* (2013.01); *H01M 2004/027* (2013.01); *H01M 2220/20* (2013.01); *H01M 2300/0028* (2013.01); *Y02E 60/122* (2013.01)

(58) Field of Classification Search
  CPC .... H01M 4/366; H01M 4/587; H01M 10/052; H01M 10/0525; H01M 10/0569; H01M 2220/20; H01M 2300/0028; Y02E 60/122
  See application file for complete search history.

(56) References Cited

U.S. PATENT DOCUMENTS

| | | | |
|---|---|---|---|
| 2013/0260252 A1 | 10/2013 | Sheem et al. | |
| 2013/0330622 A1* | 12/2013 | Sasaki | H01M 4/134 429/217 |
| 2015/0270538 A1* | 9/2015 | Kim | H01M 4/366 429/231.8 |
| 2016/0013481 A1* | 1/2016 | Jeong | H01M 4/364 429/231.8 |

FOREIGN PATENT DOCUMENTS

| | | | |
|---|---|---|---|
| JP | 2004127723 A | 4/2004 | |
| JP | 2007317551 A | 12/2007 | |
| JP | 2009535776 A | 10/2009 | |
| JP | 2010205827 A | 9/2010 | |
| JP | 2010218758 A | 9/2010 | |
| JP | 2011216241 A | 10/2011 | |
| KR | 19990067584 A | 8/1999 | |
| KR | 20080036255 A | 4/2008 | |
| KR | 20090109225 A | 10/2009 | |
| KR | 20130037150 A | 4/2013 | |
| KR | 20130109785 A | 10/2013 | |
| KR | 20140085822 A | 7/2014 | |
| KR | 101430733 B1 | 8/2014 | |

* cited by examiner

NEGATIVE ELECTRODE ACTIVE MATERIAL AND NEGATIVE ELECTRODE INCLUDING THE SAME

CROSS-REFERENCE TO RELATED APPLICATIONS

The present application is a national phase entry under 35 U.S.C. § 371 of International Application No. PCT/KR2016/004360 filed Apr. 26, 2016, which claims priority from Korean Patent Application Nos. 10-2015-0060452, filed on Apr. 29, 2015, and 10-2016-0049966, filed on Apr. 25, 2016, the disclosures of which are incorporated herein by reference.

TECHNICAL FIELD

The present invention relates to a negative electrode active material and a negative electrode including the same.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, high operating potential, long cycle life, and low self-discharging rate have been subjected to considerable research and have been commercialized and widely used.

Also, in line with growing concerns about environmental issues, a significant amount of research into electric vehicles and hybrid electric vehicles, which may replace vehicles using fossil fuels, such as gasoline vehicle and diesel vehicle, one of major causes of air pollution, has been conducted. Nickel-metal hydride secondary batteries have been mainly used as power sources of the electric vehicles and hybrid electric vehicles. Especially, research into the use of lithium secondary batteries having high energy density and discharge voltage has been actively conducted and some of the research are in a commercialization stage.

A typical lithium secondary battery uses graphite as a negative electrode active material, and charge and discharge of the lithium secondary battery is performed while a process of intercalating and deintercalating lithium ions from a positive electrode into and out of a negative electrode is repeated. Although there is a difference in theoretical capacity of the battery according to the type of electrode active materials, charge and discharge capacities may be generally reduced as cycles proceed.

As the related art, a negative electrode active material for a lithium secondary battery, which includes spheronized natural graphite particles in which flaky natural graphite fragments are structured in the shape of a cabbage on a surface portion thereof and a random shape in the center thereof and granulated; and spheronized natural graphite-modified composite particles including amorphous or semicrystalline carbon, wherein a gap between the flaky natural graphite fragments by sonication is present in the surface portion of the spheronized natural graphite particles, surfaces of the spheronized natural graphite particles are coated with the amorphous or semicrystalline carbon, and the amorphous or semicrystalline carbon is present in the gap so as to maintain the gap existing in the surface portion of the spheronized natural graphite particles, and a method of preparing the same have been proposed.

However, since the amorphous carbon appears outside the negative electrode active material, the efficiency of the secondary battery may be reduced and electrolyte solution consumption may be increased.

Thus, there is a need to develop a negative electrode active material which has a high initial efficiency and low diffusion resistance of lithium ions while reducing the electrolyte solution consumption.

PRIOR ART DOCUMENT

Korean Patent No. 10-1430733

DISCLOSURE OF THE INVENTION

Technical Problem

An aspect of the present invention provides a negative electrode active material, which has a high initial efficiency and low diffusion resistance of lithium ions while reducing electrolyte solution consumption, and a method of preparing the same.

Another aspect of the present invention provides a negative electrode including the negative electrode active material.

Another aspect of the present invention provides a secondary battery including the negative electrode, and a battery module and a battery pack which include the secondary battery.

Technical Solution

According to an aspect of the present invention, there is provided a negative electrode active material which includes a core including artificial graphite and hard carbon; and a shell surrounding the core and including natural graphite, wherein the shell is formed to cover a surface of the core by stacking and heading the natural graphite.

According to another aspect of the present invention, there is provided a method of preparing a negative electrode active material including mixing artificial graphite; hard carbon; and long flaky natural graphite having an average length, which is 20 times to 30 times longer than a material having a relatively small average length or average particle diameter among an average length of the artificial graphite to an average particle diameter of the hard carbon, and spheronizing the mixture.

According to another aspect of the present invention, there is provided a negative electrode in which a negative electrode collector is coated with a negative electrode material mixture including the negative electrode active material.

According to another aspect of the present invention, there is provided a secondary battery which includes the negative electrode, a positive electrode coated with a positive electrode material mixture including a positive electrode active material, and an electrolyte solution.

According to another aspect of the present invention, there is provided a battery module and a battery pack which include the secondary battery.

Advantageous Effects

Since a negative electrode active material according to the present invention has a structure in which natural graphite completely surrounds artificial graphite and hard carbon, the hard carbon having a low initial efficiency and high electrolyte solution consumption is not exposed to the outside, and thus, high initial efficiency and life characteristics may be achieved.

Also, since the natural graphite, the artificial graphite, and the hard carbon are all used as negative electrode active material components, diffusion resistance of lithium ions is lower than that of a case where the natural graphite is only used, and thus, a negative electrode having high output characteristics may be prepared.

DESCRIPTION OF THE SYMBOLS

1: Artificial graphite
3: Hard carbon
5: Natural graphite
10: Negative electrode active material

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Among materials used as a graphite-based negative electrode active material of a typical secondary battery, natural graphite may have high diffusion resistance of lithium ions due to a small interplanar distance between graphenes, and hard carbon is disadvantageous in that an initial efficiency of the battery is low due to high electrolyte solution consumption.

Thus, the present invention attempts to provide a negative electrode active material, in which a high initial efficiency and low diffusion resistance of lithium ions are obtained while having low electrolyte solution consumption by preventing hard carbon from being directly exposed to an electrolyte solution, and a negative electrode and a secondary battery which include the negative electrode active material.

Figure 1:
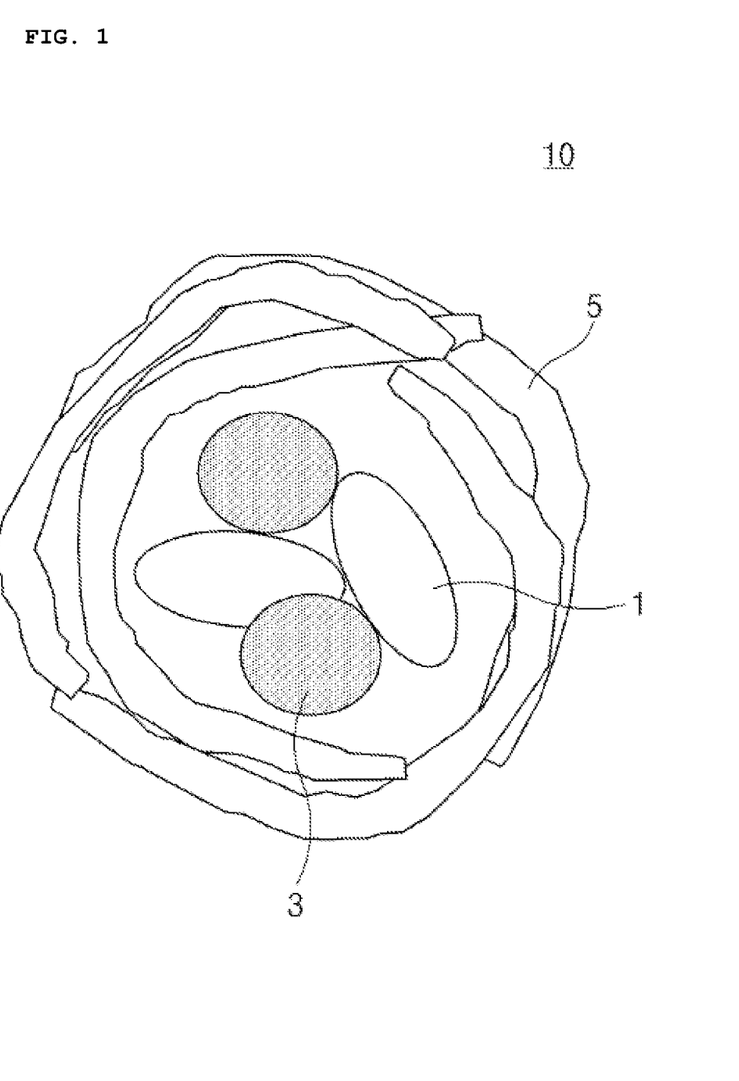
FIG. 1 is a schematic view illustrating a structure of a negative electrode active material according to the present invention.

Specifically, a schematic view of a negative electrode active material according to the present invention is illustrated in FIG. 1, and the negative electrode active material according to the present invention will be described in detail with reference to FIG. 1.

A negative electrode active material 10 according to the present invention includes a core including artificial graphite 1 and hard carbon 3; and a shell surrounding the core and including natural graphite 5, wherein the shell is formed to cover a surface of the core by stacking and heading the natural graphite.

First, in the negative electrode active material according to the present invention, the artificial graphite included in the core is crystalline carbon in which crystals are artificially developed from cokes powder or the like by a high-temperature sintering process. A typical example of the artificial graphite may be artificial graphite heat-treated at 2,800° C. or more, graphitized mesocarbon microbeads (MCMB) in which MCMB is heat-treated at 2,000° C. or more, or graphitized mesophase pitch-based carbon fibers in which mesophase pitch-based carbon fibers are heat-treated at 2,000° C. or more, but the present invention is not limited thereto.

The artificial graphite may have a flaky shape, i.e., a scale-like shape, and an average length ($L_{50}$) of a major axis may be in a range of 5 μm to 7 μm.

Since a heat treatment is performed at about 3,000° C. in a manufacturing process of the artificial graphite, the artificial graphite is in a state in which functional groups on its surface are entirely removed. Thus, since an irreversible reaction caused by a side reaction is reduced, the artificial graphite has a high initial efficiency.

Since the artificial graphite is used as the core of the negative electrode active material in the present invention, the artificial graphite may compensate for a disadvantage that the hard carbon and the natural graphite have relatively low initial efficiencies.

Also, in the negative electrode active material of the present invention, the hard carbon included in the core may include a material, in which at least one carbonaceous material selected from the group consisting of sucrose, a phenol resin, a furan resin, furfuryl alcohol, polyacrylonitrile, polyimide, an epoxy resin, cellulose, and styrene is carbonized, and may include a phenolic resin sintered body, polyacrylonitrile-based carbon fibers, pseudo-isotropic carbon, or a furfuryl alcohol resin sintered body (PFA). Also, the hard carbon may include amorphous carbon.

The hard carbon may have a spherical shape, and an average diameter ($D_{50}$) of the hard carbon may be in a range of 4 μm to 6 μm.

In the present invention, since the hard carbon is used as the core of the negative electrode active material, low solid diffusivity of lithium ions mobility due to high crystallinity of the graphite may be overcome and buffering capacity for volume expansion may be improved.

In the negative electrode active material according to an embodiment of the present invention, an average diameter ($D_{50}$) of the core may be in a range of 9 μm to 13 μm.

Also, total about 2 to 4 artificial graphite and hard carbon may be included in the core, but the present invention is not limited thereto. Specifically, a weight ratio of the artificial graphite to the hard carbon may be in a range of 1:0.1 to 1:1.0, for example, 1:0.66. Since the artificial graphite and the hard carbon are included at the above weight ratio, a negative electrode active material having strong adhesion and improved buffering capacity for volume expansion as well as high lithium ion diffusivity may be achieved.

Furthermore, the negative electrode active material according to the embodiment of the present invention may include a shell which surrounds the core and includes natural graphite.

The shell may have a shape in which the natural graphite is stacked and headed to cover the surface of the core. Specifically, the shell has a shape of completely surrounding the artificial graphite and the hard carbon in the core, a plurality of long flaky natural graphite in the shell are stacked in a random orientation to cover the entire surface of the core, and, as a result, the negative electrode active material including the core and the shell may have a spherical shape. Particularly, in the negative electrode active material of the present invention, since the shell is in the form of surrounding the entire surface of the core so that the artificial graphite and the hard carbon in the core are not exposed to the outside of the shell, the shell prevents the hard carbon constituting the core from being exposed to the electrolyte solution. Thus, the secondary battery prepared by using the negative electrode active material of the present invention may achieve a high initial efficiency.

In this case, the natural graphite included in the shell may include crystalline carbon.

Particularly, the natural graphite may be long flaky natural graphite having an average length ($L_{50}$) which is 20 times to 30 times longer than a material having a relatively small average length or average particle diameter among an average length of the artificial graphite or an average particle diameter of the hard carbon. The expression "long flaky" denotes a shape having a long length, and, specifically, an aspect ratio (length of major axis/length of minor axis) of the long flaky natural graphite may be in a range of 25 to 100. In a case in which the natural graphite having the above-described length is used, the natural graphite may completely surround the surface of the core so that the artificial graphite and hard carbon used as the core are not in contact with the outside. In a case in which the average length of the natural graphite is less than 20 times to the material having a relatively small average length or average particle diameter among the average length of the artificial graphite or the average particle diameter of the hard carbon, since the natural graphite does not completely surround the surface of the core, the hard carbon is exposed to the electrolyte solution so that a low initial efficiency may be obtained, and, in a case in which the average length of the natural graphite is greater than 30 times to the material, since the hard carbon is exposed to the electrolyte solution while the long flaky natural graphite are agglomerated to each other instead of surrounding the artificial graphite and hard carbon core, the initial efficiency may be reduced.

Specifically, with respect to the negative electrode active material of the present invention, diameters of the artificial graphite and the hard carbon in the core may be in a range of about 4 μm to about 7 μm, and a length of the natural graphite in the shell may be in a range of about 80 μm to about 120 μm. In this case, the long flaky natural graphite may completely surround the artificial graphite and the hard carbon while a few to a few tens of the long flaky natural graphite are stacked in a random orientation on the surface of the core which is composed of a few to a few tens of the artificial graphite and hard carbon.

Also, in the negative electrode active material of the present invention, a thickness of the shell may be a distance from an inner side of the natural graphite disposed at a position nearest to the center of the core to an outer side of the natural graphite disposed at a position farthest from the center.

Specifically, the thickness of the shell may be in a range of about 5 μm to about 12 μm. In a case in which the thickness of the shell is less than 5 μm, since there is a high possibility that the hard carbon having high electrolyte solution consumption is in contact with the electrolyte solution, the initial efficiency of the battery may be decreased and irreversible capacity may be reduced. In a case in which the thickness of the shell is greater than 12 μm, the diffusion resistance of lithium ions may be increased.

An average diameter ($D_{50}$) of the negative electrode active material of the present invention may be in a range of 14 μm to 25 μm.

In the negative electrode active material of the present invention, a weight ratio of the core to the shell may be in a range of 1:0.5 to 1:1.5, for example, 1:1. Since the above weight ratio is satisfied, the shell may surround the core to prevent a reaction with the electrolyte solution while obtaining high lithium ion diffusivity of the core. Thus, an excellent initial efficiency may be obtained.

Furthermore, according to an embodiment of the present invention, provided is a method of preparing a negative electrode active material including:

mixing artificial graphite; hard carbon; and long flaky natural graphite having an average length, which is 20 times to 30 times longer than a material having a relatively small average length or average particle diameter among an average length of the artificial graphite or an average particle diameter of the hard carbon, and spheronizing the mixture.

When the artificial graphite and the hard carbon are mixed with the long flaky natural graphite having an average length, which is 20 times to 30 times longer than the material having a relatively small average length or average particle diameter among the average length of the artificial graphite or the average particle diameter of the hard carbon, and the mixture is spheronized as in the present invention, the long flaky natural graphite is structured in the form of surrounding the artificial graphite and the hard carbon. Specifically, since the plurality of long flaky natural graphite are stacked in a random orientation on the surfaces of the plurality of artificial graphite and hard carbon, a negative electrode active material having a core-shell structure, in which the surface of the core is not exposed to the outside, may be prepared.

The spheronizing may be performed by a drum mixer, but a dry tumbler, a super mixer, a Henschel mixer, a flash mixer, an air blender, a flow jet mixer, a ribbon cone mixer, a pug mixer, a Nauta mixer, a ribbon mixer, a Spartan ryuzer, a Lodige mixer, and a planetary mixer may be used, and a kneader, such as a screw kneader; a defoaming kneader; an apparatus such as a paint shaker; a pressure kneader; and a twin-roll kneader, may be used. However, an apparatus for the spheronization is not limited thereto, and an apparatus capable of mixing two or more materials may be appropriately selected and used.

In this case, the drum mixer may be rotated at a rotation speed of 700 rpm to 1,000 rpm for 120 minutes to 150 minutes.

In a case in which the mixing is performed at a rotation speed of the drum mixer of less than 700 rpm or for less than 120 minutes, since a rotational force is not sufficient, the natural graphite may not be spheronized in the form of surrounding the artificial graphite and the hard carbon. In a case in which the mixing is performed at a rotation speed of the drum mixer of greater than 1,000 rpm or for greater than 150 minutes, since areas of the artificial graphite and the hard carbon, which are not surrounded by the natural graphite, are increased while the long flaky natural graphite breaks due to the excessive rotational force, the initial efficiency may be reduced.

Also, in an embodiment of the present invention, provided is a negative electrode in which a negative electrode collector is coated with a negative electrode material mixture including the negative electrode active material.

Specifically, after a slurry is prepared by mixing the negative electrode material mixture including the negative electrode active material of the present invention with an organic solvent, the negative electrode may be prepared by coating the negative electrode collector with the slurry and then drying and rolling the coated negative electrode collector.

In this case, the negative electrode collector is not particularly limited as long as it has conductivity without causing adverse chemical changes in the battery, and, for example, copper, stainless steel, aluminum, nickel, titanium, baked carbon, or aluminum or stainless steel that is surface-treated with one of carbon, nickel, titanium, silver, or the like may be used.

Since the natural graphite completely surrounds the artificial graphite and the hard carbon, the hard carbon having a low initial efficiency and high electrolyte solution consumption is not exposed to the outside, and thus, the negative electrode active material of the present invention may exhibit high initial efficiency and life characteristics. Also, since the natural graphite, the artificial graphite, and the hard carbon are all used, diffusion resistance of lithium ions is lower than that of a case where the natural graphite is only used, and thus, high output characteristics may be achieved.

In some cases, the negative electrode material mixture of the present invention may further include at least one of a conductive agent, a binder, and a filler.

The conductive agent is not particularly limited as long as it has conductivity without causing adverse chemical changes in the battery, and, conductive materials, for example, graphite such as natural graphite and artificial graphite; a carbon-based material such as carbon black, acetylene black, Ketjen black, channel black, furnace black, lamp black, and thermal black; conductive fibers such as carbon fibers or metal fibers; metal powder such as carbon fluoride, aluminum and nickel powders; conductive whiskers such as zinc oxide whiskers and potassium titanate whiskers; conductive metal oxides such as titanium oxide; or conductive material such as polyphenylene derivatives, may be used.

The conductive agent may be typically included in an amount of 1 wt % to 30 wt % based on a total weight of a mixture including the negative electrode active material.

The binder is not particularly limited as long as it is a component that assists in the binding between the active material and the conductive agent and in the binding with the current collector, and, for example, may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber, a fluoro rubber, and various copolymers.

The binder may be typically included in an amount of 1 wt % to 30 wt % based on the total weight of the mixture including the negative electrode active material.

The filler, as a component inhibiting expansion of the electrode, may be selectively used, and is not particularly limited as long as it is a fibrous material which does not cause adverse chemical changes in the battery. For example, olefin-based polymers such as polyethylene and polypropylene; and fibrous materials, such as glass fibers and carbon fibers, may be used.

Furthermore, in an embodiment of the present invention, provided is a lithium secondary battery including a positive electrode, a negative electrode, a separator disposed between the positive electrode and the negative electrode, and a non-aqueous electrolyte solution, wherein the negative electrode includes the negative electrode of the present invention.

The positive electrode may be prepared by a typical method known in the art, for example, coating a positive electrode collector with a positive electrode active material slurry, compressing, and then drying the coated positive electrode collector.

In this case, the positive electrode active material slurry may include a positive electrode active material and may further selectively include a conductive agent, a binder, and a filler.

The positive electrode collector is not particularly limited as long as it has conductivity without causing adverse chemical changes in the battery, and, for example, stainless steel, aluminum, nickel, titanium, baked carbon, or aluminum or stainless steel that is surface-treated with one of carbon, nickel, titanium, silver, or the like may be used.

A lithium transition metal oxide may be used as a specific example of the positive electrode active material. Examples of the lithium transition metal oxide may be Li.Co-based composite oxides such as $LiCoO_2$, Li.Ni.Co.Mn-based composite oxides such as $LiNi_xCo_yMn_zO_2$, Li.Ni-based composite oxides such as $LiNiO_2$, and Li.Mn-based composite oxides such as $LiMn_2O_4$, and these oxides may be used alone or in a mixture thereof.

The same or different conductive agent, binder, and filler from those included in the negative electrode material mixture may be used.

The non-aqueous electrolyte solution may be formed of an electrolyte solution and a lithium salt, and a non-aqueous organic solvent is used as the electrolyte solution.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

The lithium salt is a material that is readily soluble in the non-aqueous electrolyte solution, w herein, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, chloroborane lithium, lower aliphatic carboxylic acid lithium, lithium tetraphenyl borate, and imide may be used.

In particular, in a case in which propylene carbonate (PC) used as a non-aqueous electrolyte solution of conventional secondary battery, exfoliation of artificial graphite used in a negative electrode active material may occur. However, since the negative electrode active material of the present invention has a core/shell structure, i.e., a structure in which the surface of the artificial graphite is surrounded by the natural graphite, a phenomenon, in which the artificial graphite is exfoliated by the propylene carbonate electrolyte solution, may be suppressed.

Also, according to another embodiment of the present invention, a battery module including the secondary battery as a unit cell and a battery pack including the battery module are provided. Since the battery module and the battery pack include the secondary battery having excellent efficiency and output characteristics as well as stability, the battery module and the battery pack may be used as a power source of any one or more of medium and large sized devices, for example, a power tool; electric cars including an electric vehicle (EV), a hybrid electric vehicle (HEV), and a plug-in hybrid electric vehicle (PHEV); or a power storage system.

Hereinafter, exemplary embodiments of the present invention will be described in detail to fully explain the present invention in such a manner that it may easily be carried out by a person with ordinary skill in the art to which the present invention pertains. However, the present invention may be modified in various forms and is not limited to the disclosed embodiments.

EXAMPLES

Example 1

(Step 1) 300 g of flaky artificial graphite having an average length (L$_{50}$) of a major axis of 6 μm, 200 g of hard carbon having an average diameter (D50) of 4 μm, and 500 g of natural graphite having an average length (L$_{50}$) of 100 μm were put in a drum mixer and mixed while rotating the mixer at a speed of 800 rpm for 120 minutes to prepare a negative electrode active material in the form in which the natural graphite surrounds the artificial graphite and the hard carbon.

(Step 2) After the negative electrode active material prepared in step 1, a styrene-butadiene rubber (SBR), and carboxymethylcellulose (CMC) were mixed at a weight ratio of 97.0:1.5:1.5 to prepare a negative electrode active material mixture, the negative electrode active material mixture was coated on a copper foil, and the coated copper foil was then dried and rolled to prepare a half coin cell. In the cell, lithium metal was used as a counter electrode, and an electrolyte solution was used in which 1 M LiPF$_6$ was dissolved in a carbonate solvent.

Example 2

A half coin cell was prepared in the same manner as in Example 1 except that natural graphite having an average length (L$_{50}$) of 90 μm was used in step 1 of Example 1.

Comparative Example 1

A half coin cell was prepared in the same manner as in Example 1 except that natural graphite having an average length (L$_{50}$) of 50 μm was used in step 1 of Example 1.

Comparative Example 2

A half coin cell was prepared in the same manner as in Example 1 except that natural graphite having an average length (L$_{50}$) of 20 μm was used in step 1 of Example 1.

Comparative Example 3

A half coin cell was prepared in the same manner as in Example 1 except that natural graphite having an average length (L$_{50}$) of 10 μm was used in step 1 of Example 1.

Comparative Example 4

A half coin cell was prepared in the same manner as in Example 1 except that natural graphite having an average length (L$_{50}$) of 128 μm was used in step 1 of Example 1.

Comparative Example 5

A half coin cell was prepared in the same manner as in Example 1 except that natural graphite having an average length (L$_{50}$) of 100 μm was only put in the drum mixer in step 1 of Example 1, instead of putting flaky artificial graphite and hard carbon.

EXPERIMENTAL EXAMPLES

Experimental Example 1. Morphological Observation of Negative Electrode Active Material In order to observe the morphology of the negative electrode active material prepared in step 1 of Example 1, the negative electrode active material was dispersed by putting an antacid in a solution in which water and the negative electrode active material were mixed in a ratio of 95%:5%, and the negative electrode active material was observed with a micro particle size analyzer (instrument name: mastersizer3000, manufacturer: Malvern Instruments Ltd.).

According to the results of the observation, it may be understood that a spherical negative electrode active material having a diameter of 16 μm to 20 μm was prepared.

Experimental Example 2. Initial Efficiency Measurement

Figure 2:
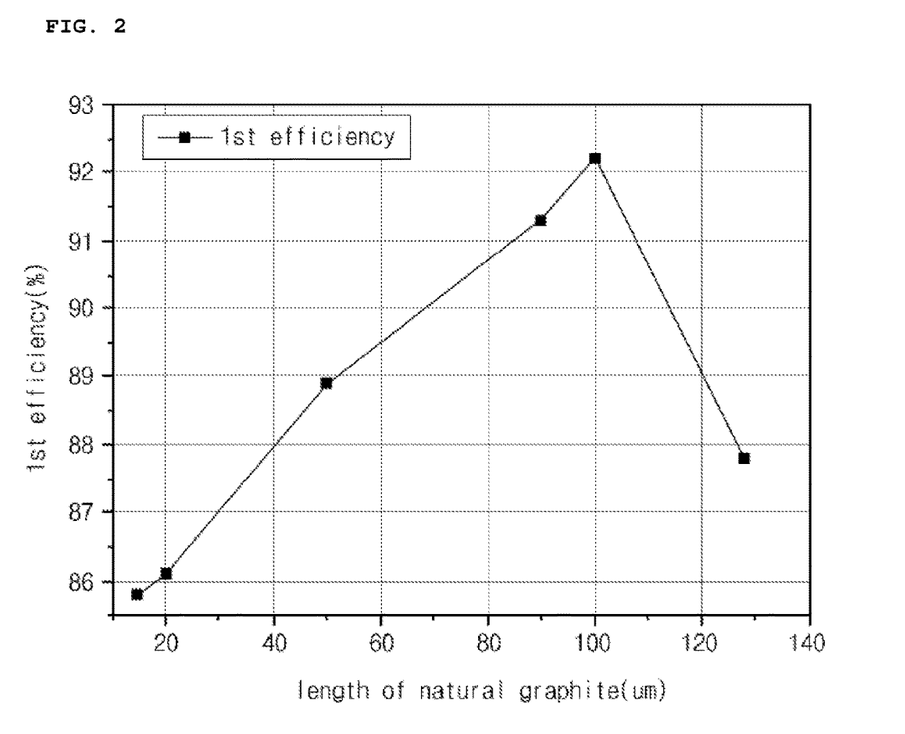
FIG. 2 is a graph illustrating the results of initial efficiency measurement according to Experimental Example 1 of the present invention.

Initial efficiencies of the half coin cells prepared in Examples 1 and 2 and Comparative Examples 1 to 4 were measured, and the results thereof are presented in Table 1. Specifically, each half coin cell was charged at a current density of 0.1 C to a voltage of 5 mV in a constant current (CC) mode, and the charge was then completed when the current density became 0.005 C while the voltage was constantly maintained at 5 mV in a constant voltage (CV) mode. Each half coin cell was discharged at a current density of 0.1 C to a voltage of 1.5 V in a CC mode and the discharge was completed to obtain the initial efficiency. The results thereof are presented in the following Table 1 and FIG. 2.

TABLE 1

| | Average diameter of hard carbon (μm) | Average length of natural graphite (μm) | Ratio of average diameter of hard carbon:average length of natural graphite | Initial efficiency (%) |
|---|---|---|---|---|
| Example 1 | 4 | 100 | 1:25 | 92.2 |
| Example 2 | 4 | 90 | 1:22.5 | 91.3 |
| Comparative Example 1 | 4 | 50 | 1:12.5 | 88.9 |
| Comparative Example 2 | 4 | 20 | 1:5 | 86.1 |
| Comparative Example 3 | 4 | 10 | 1:2.5 | 85.3 |
| Comparative Example 4 | 4 | 128 | 1:32 | 87.8 |

As illustrated in Table 1, it may be understood that Examples 1 and 2 each exhibited an initial efficiency of about 91% to about 92%, but Comparative Examples 1 to 4 each exhibited an initial efficiency of about 85% to about 89%. Particularly, it may be understood that Example 1 exhibited an initial efficiency that is about 7% higher than that of Comparative Example 3.

From the above results, when the long flaky natural graphite having a length, which is 20 times to 30 times longer than the diameter of the relatively small hard carbon, was used as in Examples 1 and 2 different from Comparative Examples 1 to 3 in which the long flaky natural graphite having a length of less than 20 times the diameter of the hard carbon was used, since the natural graphite may surround both of the artificial graphite and the hard carbon in the core, it may be understood that an efficiency of greater than 90%, i.e., an initial efficiency of conventional natural graphite, was obtained. With respect to Comparative Examples to 3, since the short natural graphite was used, the natural graphite may not completely surround the core, and thus, the hard carbon was consumed by being directly exposed to the electrolyte solution. Therefore, it may be understood that Comparative Examples 1 to 3 each exhibited a low initial efficiency of conventional hard carbon.

With respect to Comparative Example 4, since the long flaky natural graphite having a length, which is greater than 30 times the diameter of the hard carbon, was used, the long flaky natural graphite did not surround the hard carbon and artificial graphite core while the long natural graphite flakes were agglomerated to each other. Thus, it may be understood that the hard carbon was exposed to the electrolyte solution to reduce the initial efficiency.

Experimental Example 3. Irreversible Capacity Measurement

Figure 3:
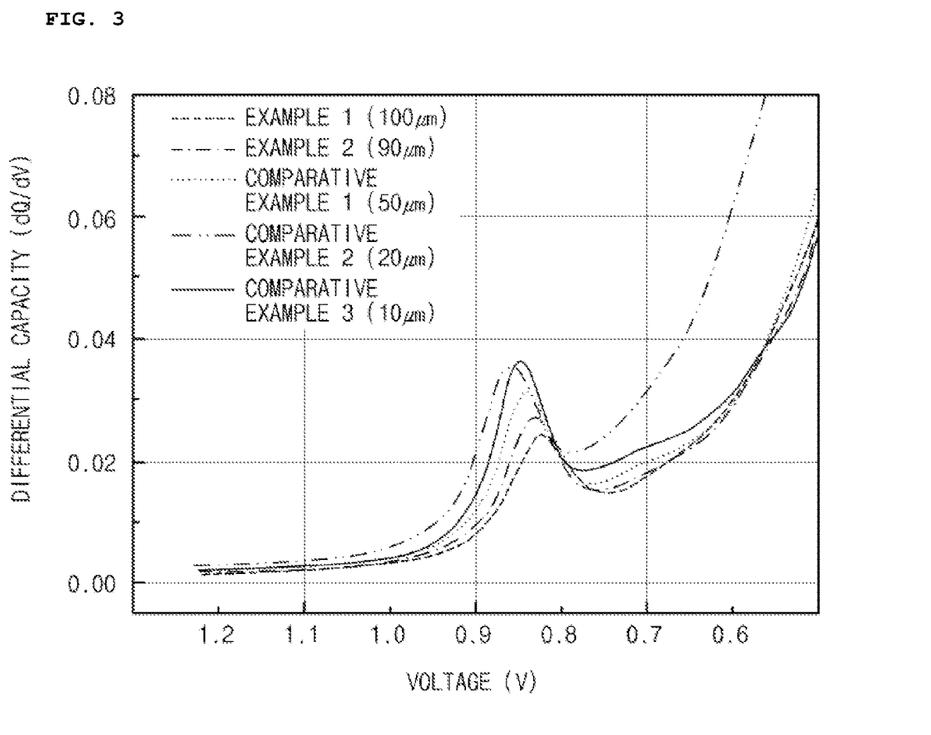
FIG. 3 is a graph illustrating the results of measuring irreversible capacities at a first charge process of batteries prepared in Examples 1 and 2 of the present invention and Comparative Examples 1 to 3.

Irreversible capacities of the half coin cells prepared in Examples 1 and 2 and Comparative Examples 1 to 3 in a first charge process were measured, and the results thereof are presented in FIG. 3.

Specifically, each half coin cell was charged at a current density of 0.1 C to a voltage of 5 mV in a CC mode, and the charge was then completed when the current density became 0.005 C while the voltage was constantly maintained at 5 mV in a CV mode. Each half coin cell was discharged at a current density of 0.1 C to a voltage of 1.5 V in a CC mode and the discharge was completed to obtain a graph showing an irreversible region.

As illustrated in FIG. 3, at 0.9 V as a voltage of the region corresponding to an irreversible reaction, dQ/dV of Comparative Example 2 was the highest at 0.020, dQ/dV of Comparative Example 3 was 0.015, dQ/dV of Comparative Example 1 was 0.012, dQ/dV of Example 2 was 0.009, and dQ/dV of Example 1 was 0.008. Thus, it may be understood that Example 1 had a value which is about ½ of values of the comparative examples.

From the above results, when the long natural graphite having a length, which is 20 times to 30 times longer than the artificial graphite and hard carbon particles of the core, was used as in Examples 1 and 2 different from when using the short flaky natural graphite, since the long natural graphite may entirely surround the hard carbon in the core, the reaction between the hard carbon and the electrolyte solution may be prevented. Thus, it may be understood that high reversible capacity may be obtained.

Experimental Example 4. Life Characteristics Investigation

Figure 4:
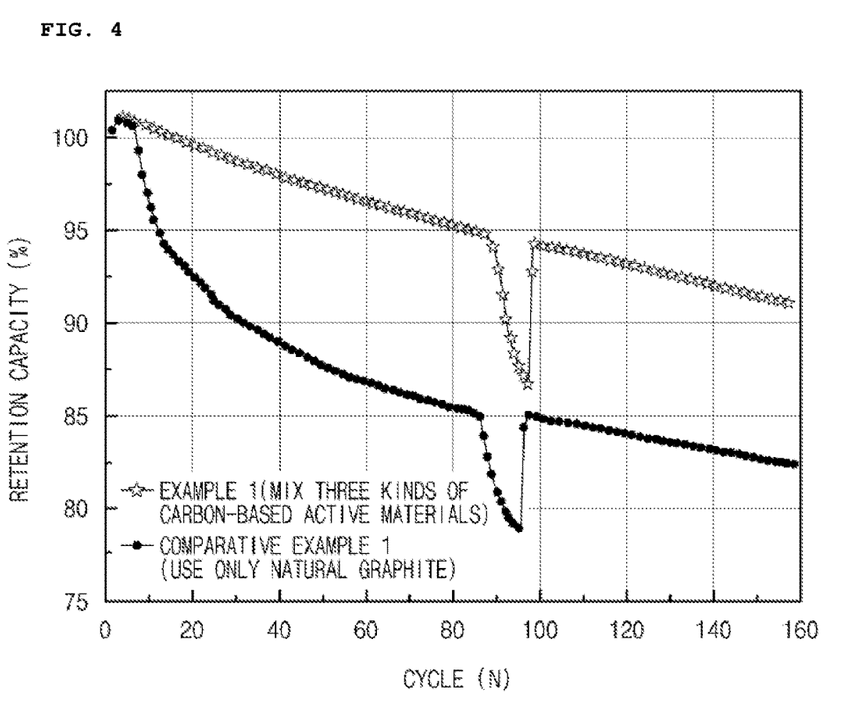
FIG. 4 is a graph illustrating the results of measuring life characteristics of batteries prepared in Example 1 of the present invention and Comparative Example 5.
Figure 5:
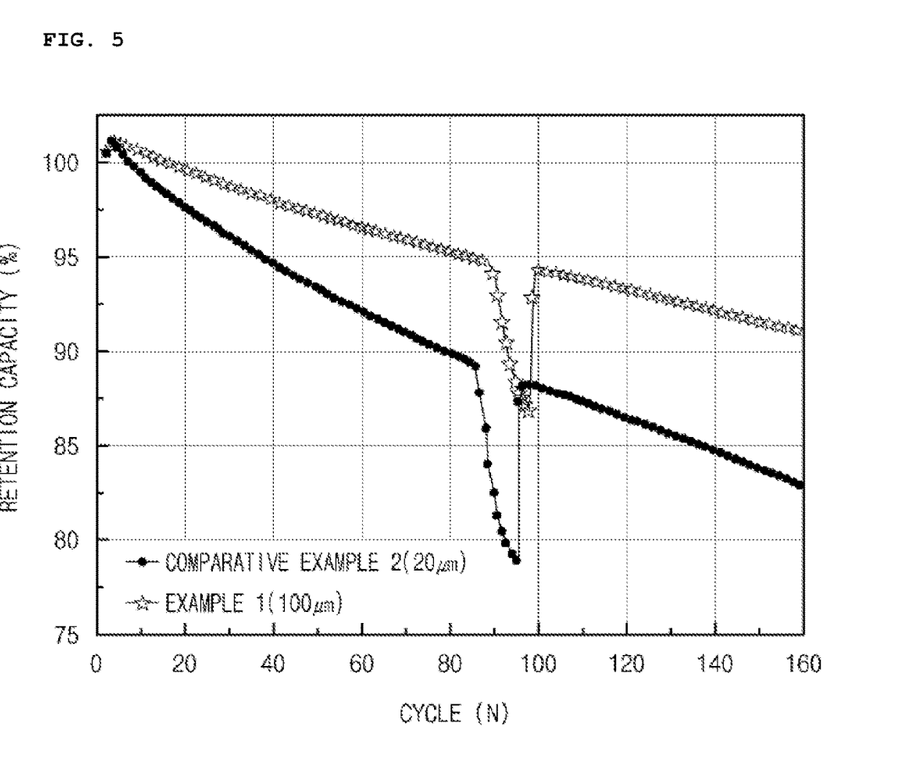
FIG. 5 is a graph illustrating the results of measuring life characteristics of batteries prepared in Example 1 of the present invention and Comparative Example 2.

Life characteristics were measured by charging and discharging the half coin cells prepared in Example 1 and Comparative Examples 2 and 5, and the results thereof are presented in FIGS. 4 and 5.

Specifically, each half coin cell was charged at a current density of 0.1 C to a voltage of 5 mV in a CC mode, and the charge was then completed when the current density became 0.005 C while the voltage was constantly maintained at 5 mV in a CV mode. Each half coin cell was discharged at a current density of 0.1 C to a voltage of 1.5 V in a CC mode and the discharge was completed. Thereafter, the charging and discharging were repeated 160 times under the same conditions as above except that the current density was only changed to 0.5 C.

As illustrated in FIG. 4, it may be understood that discharge capacity maintaining characteristics of the coin cell of Example 1, in which three kinds of the carbon-based materials were mixed and used as the negative electrode active material, were about 10% higher than those of Comparative Example 5 in which the natural graphite was only used.

Also, as illustrated in FIG. 5, the discharge capacity maintaining characteristics of the coin cell of Example 1, in which the natural graphite having a length, which is 20 times longer than the hard carbon, was used even if the same three kinds of the carbon-based materials were mixed, were about 5% higher than those of the coin cell of Comparative Example 2 in which the relatively short flaky natural graphite was used.

From the above results, in a case in which the artificial graphite and hard carbon were further added and used, the resistance to the diffusion of lithium ions was reduced in comparison to a case where the natural graphite was only used as the negative electrode active material, and thus, it may be understood that a secondary battery having improved life characteristics may be prepared. Also, when three kinds of the carbon-based materials were mixed and used, since the reaction with the electrolyte solution due to the contact between the hard carbon and the electrolyte solution may be reduced in a case in which the length of the natural graphite was particularly long enough to completely surround the artificial graphite and the hard carbon, it may be understood that better life characteristics may be obtained in comparison to a case where the short flaky natural graphite was used.

Although the exemplary embodiments of the present invention have been described in detail, the scope of the present invention is not limited thereto but various modifications and improvements made by those skilled in the art using the basic concept of the present invention defined in the claims also fall within the scope of the present invention.

The invention claimed is:

1. A negative electrode active material for a secondary battery, the negative electrode active material comprising:
   a core including artificial graphite and hard carbon; and
   a shell surrounding the core and including natural graphite,
   wherein the shell is formed to cover a surface of the core by stacking and heading the natural graphite, and
   wherein a diameter of the hard carbon is in a range of 4 μm to 7 μm, and a length of the natural graphite is in a range of 80 μm to 120 μm.

2. The negative electrode active material for a secondary battery of claim 1, wherein the natural graphite is long flaky natural graphite having an average length which is 20 times to 30 times longer than a material having a relatively small average length or average particle diameter among an average length of the artificial graphite or an average particle diameter of the hard carbon.

3. The negative electrode active material for a secondary battery of claim 1, wherein a diameter of the core is in a range of 9 μm to 13 μm, and a thickness of the shell is in a range of 5 μm to 12 μm.

4. The negative electrode active material for a secondary battery of claim 1, wherein a diameter of the negative electrode active material is in a range of 14 μm to 25 μm.

5. The negative electrode active material for a secondary battery of claim 1, wherein the hard carbon is at least one selected from the group consisting of a phenolic resin sintered body, polyacrylonitrile-based carbon fibers, pseudo-isotropic carbon, or a furfuryl alcohol resin sintered body (PFA).

6. The negative electrode active material for a secondary battery of claim 1, wherein a weight ratio of the artificial graphite to the hard carbon is in a range of 1:0.1 to 1:1.0.

7. The negative electrode active material for a secondary battery of claim 1, wherein a weight ratio of the core to the shell is in a range of 1:0.5 to 1:1.5.

8. A method of preparing the negative electrode active material for a secondary battery of claim 1, the method comprising mixing artificial graphite; hard carbon; and long flaky natural graphite having an average length, which is 20 times to 30 times longer than a material having a relatively small average length or average particle diameter among an average length of the artificial graphite or an average particle diameter of the hard carbon, and spheronizing the mixture.

9. The method of claim 8, wherein the spheronizing is performed by a drum mixer.

10. The method of claim 8, wherein the drum mixer is rotated at a rotation speed of 700 rpm to 1,000 rpm for 120 minutes to 150 minutes to spheronize the natural graphite.

11. A negative electrode for a secondary battery in which a negative electrode collector is coated with a negative electrode material mixture including the negative electrode active material of claim 1.

12. A lithium secondary battery comprising:
    a positive electrode;
    a negative electrode;
    a separator disposed between the positive electrode and the negative electrode; and
    a non-aqueous electrolyte solution,
    wherein the negative electrode is the negative electrode of claim 11.

13. The lithium secondary battery of claim 12, wherein the non-aqueous electrolyte solution includes a non-aqueous organic solvent and a lithium salt.

14. The lithium secondary battery of claim 13, wherein the non-aqueous organic solvent comprises propylene carbonate.

15. A battery module comprising the lithium secondary battery of claim 12 as a unit cell.

16. A battery pack comprising the battery module of claim 15 and used as a power source of a medium and large sized device.

17. The battery pack of claim 16, wherein the medium and large sized device is selected from the group consisting of an electric vehicle, a hybrid electric vehicle, a plug-in hybrid electric vehicle, and a power storage system.

* * * * *